Feb. 16, 1926.

J. K. RUTHS 1,572,960

STEAM POWER PLANT

Filed Nov. 1, 1919     5 Sheets-Sheet 1

Feb. 16, 1926.                                                                1,572,960
J. K. RUTHS
STEAM POWER PLANT
Filed Nov. 1, 1919          5 Sheets-Sheet 2

Feb. 16, 1926. 1,572,960
J. K. RUTHS
STEAM POWER PLANT
Filed Nov. 1, 1919 5 Sheets-Sheet 5

Fig. 8.

Patented Feb. 16, 1926.

1,572,960

UNITED STATES PATENT OFFICE.

JOHANNES KARL RUTHS, OF DJURSHOLM, SWEDEN, ASSIGNOR TO AKTIEBOLAGET VAPORACKUMULATOR, OF STOCKHOLM, SWEDEN, A CORPORATION.

STEAM-POWER PLANT.

Application filed November 1, 1919. Serial No. 335,112.

*To all whom it may concern:*

Be it known that I, JOHANNES KARL RUTHS, subject of the King of Sweden, residing at Djursholm, Sweden, have invented certain new and useful Improvements in Steam-Power Plants, of which the following is a specification.

My invention has as its object to provide steam plant systems wherein steam is accumulated in such a manner that an independence between steam generation and and steam consumption is effected while energy in steam used at low pressure is converted into power and the whole system is controlled in a manner that provides constant pressures in steam lines and in boilers regardless of variations in accumulators, whereby higher efficiency, increased production and better quality of products are obtained.

In steam plants provided with steam accumulators, it has been proposed to arrange a valve mechanism in a conduit leading steam from the steam generator in direction toward the accumulator, which valve mechanism was operated to increase the steam supply through the conduit when the pressure in the said conduit in front of the valve increased above a predetermined value, while it acted to throttle or decrease the steam supply upon a decrease of said pressure below a predetermined value, the objects being to maintain a practically constant pressure in the steam generator and in the conduit system connected therewith, and to bring about an independence between the momentary steam generation and steam consumption. In such plants however the steam in the conduit in front of the valve mechanism, was throttled down by the valve to a considerably lower pressure in the conduit leading from the valve, and this considerable drop in pressure was not utilized to create power or to do work.

My invention provides plants wherein such pressure drop produces power and consists, generally, of a source of steam, a steam motor receiving steam from said source, an accumulator supplied with steam from the motor and regulating mechanism for the motor. More specifically my invention comprises a steam generator, a steam motor supplied with steam therefrom, an accumulator supplied with steam from the motor and pressure responsive regulating means operated by pressure in front of the same to control flow of steam from the generator to the motor, the regulating means increasing flow to the motor on increase of actuating pressure and decreasing flow on decrease of actuating pressure so that the actuating pressure is maintained constant.

A further object of my invention is to make possible the regulation of a steam motor connected to supply steam to an accumulator.

The invention consists also in the combination with the above mentioned elements, of a valve mechanism arranged in parallel with the said steam motor, in order to admit steam to the accumulator without its first passing through the motor, the said valve mechanism being of such form that it will open and admit steam to the accumulator, only when the pressure in front of the valve rises above a predetermined value.

Further phases of the invention will be apparent as the description proceeds, it being understood that the invention is not limited to the specific arrangements or constructions shown. Many changes in arrangements and construction will be obvious to those skilled in the art to which this invention belongs.

The invention will be described more in detail with reference to the examples shown in the accompanying drawings, in which.

Figure 1:
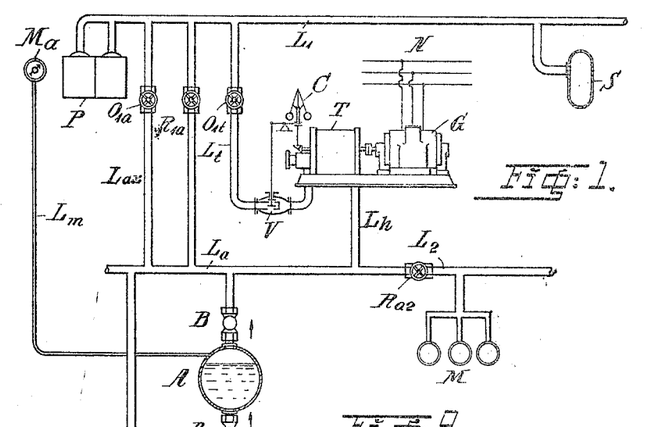
Fig. 1 is a diagrammatic view of a steam plant having my invention embodied therein.

Referring to the drawings:

Referring to Fig. 1, T designates a steam motor, in the present instance a steam turbine engine of the non-condensing type. This turbine receives steam from a generator P. through a conduit $L_1$ and a branch conduit $L_t$ leading therefrom, and the exhaust steam from the turbine is led to a conduit $L_a$ through a conduit $L_h$. A steam accumulator A is connected in parallel with the conduit $L_a$, and suitable non-return valves B, B, are inserted in the connections between the accumulator and the conduit, the direction of steam flow through said non-return valves being indicated by the arrows. A steam consumer M, in the present instance a paper making machine, is connected to a conduit $L_2$, which latter connects with the conduit $L_a$ by means of a reducing valve $R_{a2}$, the action of which reducing valve is to maintain a practically constant pressure in the conduit $L_2$.

Figures 5, 6, 9:
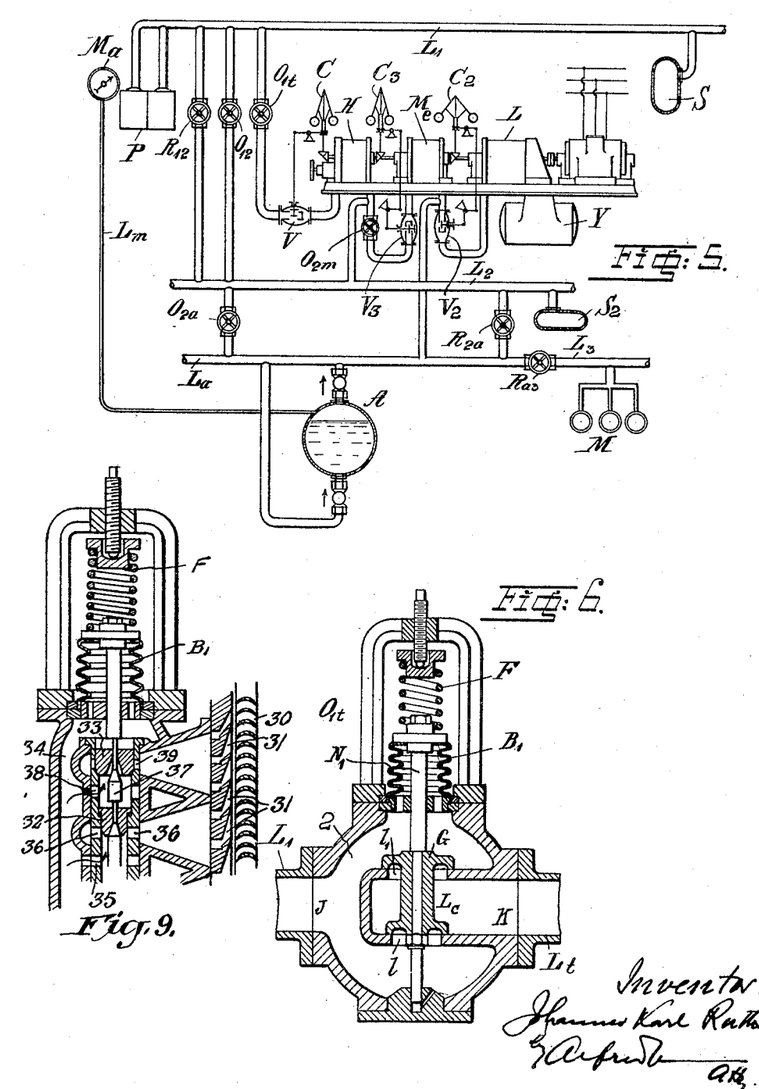
Fig. 5 is a view of a steam plant substantially similar to that of Fig. 2, but with a steam motor of the double extraction type.
Fig. 6 is a sectional view on an enlarged scale of the valve mechanism for controlling the supply of steam to the motor.
Fig. 9 is a sectional view of an alternative form of valve mechanism for controlling the supply of steam to the motor.

In accordance with my invention, I insert in the connection between the motor T and conduit $L_1$, a valve mechanism $O_{1t}$, whose function is to control the steam supply to the motor. This valve mechanism is of a construction, such for instance as shown in Fig. 6 and more fully described hereinafter, which will admit steam to the motor, and will increase the steam supply when the pressure in front of the valve exceeds a predetermined value, while decreasing the steam supply when the said pressure falls below a predetermined value.

Such a valve mechanism which increases flow upon rise of actuating pressure and decreases flow upon decrease of actuating pressure and thus operates to maintain the actuating pressure at a practically predetermined constant value, moving practically continuously within small variations to each side of the predetermined value sufficient to give the necessary force impulse for operation, I term, for convenience of description, an "over-flow" valve.

Conduit $L_a$ is connected with the conduit $L_1$ by means of a connecting conduit $L_{ax}$, and a valve mechanism $O_{1a}$ is inserted in the conduit $L_{ax}$. This valve mechanism is of a construction similar to the valve mechanism $O_{1t}$. Its function is to admit steam from conduit $L_1$ toward the accumulator, only when in exceptional cases, the pressure of steam in conduit $L_1$ exceeds a predetermined value.

The two valve mechanisms $O_{1a}$ and $O_{1t}$ are set to operate under different predetermined pressures in the conduit $L_1$, valve $O_{1t}$ opening under a lesser degree of pressure than that which will open valve $O_{1a}$. If the pressure rises above that at which valve $O_{1t}$ is fully open valve $O_{1a}$ will open and the surplus steam will be admitted by said valve $O_{1a}$ to the conduit $L_a$ and the accumulator.

From the above description it will be seen that the valve $O_{1t}$ will operate to supply the accumulator with steam when the pressure in conduit $L_1$ exceeds a predetermined value, such steam in its passage to the accumulator being utilized to operate a motor. If however as may occur in exceptional cases, the motor cannot take care of all the steam which may be coming to it under the control of valve $O_{1t}$, then valve $O_{1a}$ will open under the increased pressure created in conduit $L_1$, and will admit the surplus steam directly to the accumulator. From the above it will be understood, that the drop in pressure of steam which occurs in its passage from conduit $L_1$ to the accumulator, as controlled by valve $O_{1t}$ is utilized in the motor for the generation of power.

Between the conduits $L_1$ and $L_a$ a reducing valve $R_{1a}$ is arranged, the construction of which is well known to those skilled in the art and which operates to admit steam from conduit $L_1$ to conduit $L_a$ and thence to consumer M when in exceptional cases, the accumulator becomes completely discharged, and the pressure in the conduit $L_a$ consequently falls.

The turbine T is illustrated as driving an electric generator G operating in parallel with an electric system N, consuming all the power generated by the steam turbine, and the turbine is shown as provided with a speed governor C, connected to operate a valve mechanism V controlling the steam supply to the turbine only when the number of revolutions of the turbine exceeds the normal number. The governor acts under the normal and proper speed of the turbine to hold the valve V fully open as shown, and it acts to throttle the supply of steam only when the speed of the turbine rises above the normal.

A steam consumer S which may be in the form of a paper pulp digester, is shown as connected with the conduit $L_1$, but this consumer may be omitted, as it is not necessary to the operation of the plant in realizing the present invention.

In a steam plant with the controlling elements arranged in accordance with the present invention as described above, power will be obtained from the steam in its passage to the accumulator. Further a practically complete equalization of the variations in the steam pressures, caused either by variations in the steam generation, or in the steam consumption, will be obtained, substantially in the manner described and claimed in my co-pending application Serial No. 305,622.

Suppose, for instance, the pressure in the conduit $L_1$ increases above a predetermined value, due to increased steam generation or decreased steam consumption, or both, the over-flow valve $O_{1t}$ will be operated to increase the steam supply to the turbine T. On decrease on the other hand of the pressure in the steam conduit $L_1$ below a predetermined value, due to increased steam consumption or decreased steam production, the valve $O_{1t}$ will decrease the steam supply to the turbine T and thus the pressure in the conduit from which the motor is supplied is maintained practically constant.

If the generated power is greater than that required, the number of revolutions of the turbine T will increase above normal and the speed governor C will then throttle the steam supply to the same. In such a case the pressure in the conduit $L_1$ will rise, and as the steam supply to the turbine cannot then be increased, the pressure will increase further in conduit $L_1$, and sufficiently to open valve $O_{1a}$, whereby the surplus of steam will pass directly toward the accumulator.

The detailed construction of valve $O_{1t}$ of one form suitable for the purposes of my invention, is shown by way of example in Fig. 6. In this figure it will be seen that the valve comprises a casing 2 provided at opposite sides with ports J and K, the port J being connected with the conduit $L_1$ of Fig. 1, and the port K being connected with conduit $L_t$ of Fig. 1. Within the casing is a chamber $L_c$ connected with the port K, which chamber is formed with aligned ports $l$ and $l_1$ which are controlled by a valve member G carried by an operating stem $N_1$. The stem is connected with means for operating the valve member, which means in this instance, consists of a bellows $B_1$, the interior of which is in communication with the interior of the valve casing, and a spring F bears against the bellows and exerts its force in opposition to the expansive action of the bellows. From this construction it will be understood that the spring F being set to resist a predetermined pressure, the bellows will expand and will move the valve member and begin to open the ports $l$ and and $l_1$, when the pressure entering the casing through conduit $L_1$ overcomes the resistance of the spring, so that steam will flow through the valve and enter conduit $L_t$ and thence pass to the motor, it being understood that the increase of pressure above that necessary to start the opening movement, will act to open the valve to a greater extent, until at a still greater predetermined pressure the valve will be fully opened. It will thus be understood that if any predetermined value is selected, lying within the operating range between the predetermined value for complete closure of the valve and the predetermined value for full opening of the valve, that an increase of the actuating pressure above said any predetermined value will result in an increase of steam flow through the valve and a decrease of pressure below said any predetermined value will result in decrease of flow of steam through the valve. The overflow valve is a "regulating" valve in normal operation.

The valve member G is balanced as shown with respect to the action of the steam pressure thereon, so that the opening and throttling movements under the influence of the pressure in the conduit in front of the valve acting on the bellows, are independent of the pressure acting on the valve member itself.

Where it is desired to control the admission to the turbine by a series of nozzles, that is by what is known as sectionalized nozzle or partial regulation, the nozzles being opened or closed in succession so that the area of flow into the turbine is altered and throttling is prevented, the over-flow mechanism may comprise a pressure actuated member operating upon a series of valves built into the turbine casing as illustrated in Fig. 9. In this figure 30 designates the first wheel of a turbine to which steam is supplied through a series of nozzles 31. The nozzles are divided into groups of which each group is controlled by a valve, two valves 32 and 33 being shown in the drawing.

Chamber 34 of the turbine is connected to the steam supply main, for example, conduit $L_1$ of Fig. 1. Passage of steam to the nozzles takes place through ports 35, 38, 36 and 39, ports 36 and 39 being controlled by valves 32 and 33. Movement of the valves is effected by means of spindle 37 passing with loose fit through the valves and fitted with abutments, so that, as the spindle moves, valves 32 and 33 open or close ports 36 and 39 successively.

The spindle is moved by an arrangement similar to that of Fig. 6 comprising a bellows $B_1$, the interior of which is in communication with chamber 34.

In the position shown in the drawing, steam can enter through a part of ports 36 but not through ports 39. The steam admission is thus only partial. If the pressure in chamber 34 rises, spindle 37 will be raised and the upper abutment on the spindle will contact valve 33 and move the same to allow flow of steam through ports 39. In this manner, on increase of pressure in chamber 34, more and more steam is admitted to the turbine.

Valve $O_{1a}$ is similar in detailed construction to valve $O_{1t}$, except that spring F of valve $O_{1a}$ is adjusted to a tension which will yield and permit the valve member to open only when the pressure exceeds that which will completely open the valve member of valve mechanism $O_{1t}$.

Figure 7:
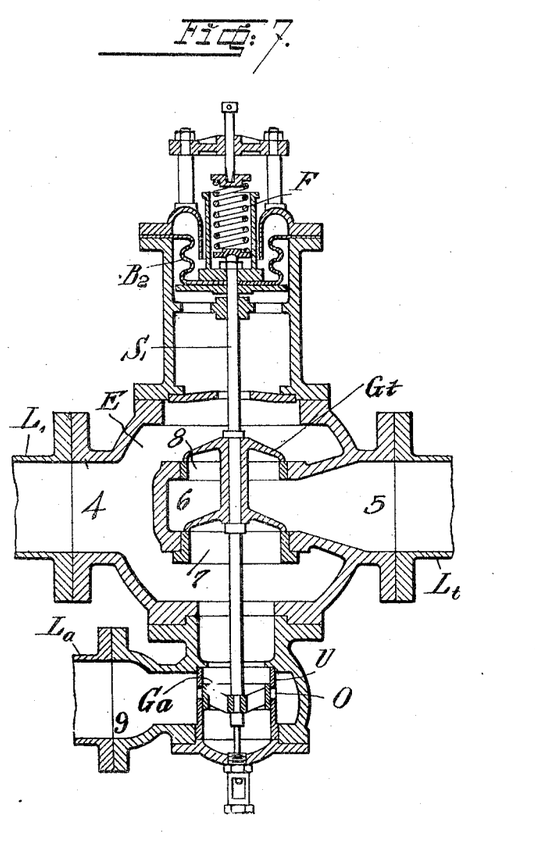
Fig. 7 is a sectional view of two valve mechanisms mechanically inter-connected for joint operation.

These two valve mechanisms in order to cooperate in this manner, may be mechanically inter-connected as shown for example in Fig. 7. Here it will be seen that the valve member $G_t$ corresponding to the valve member of valve mechanism $O_{1t}$, is arranged in a main valve casing E, while the other valve member $G_a$ corresponding to the valve member of mechanism $O_{1a}$, is arranged in a secondary valve casing forming an extension of the first. The main casing is provided with oppositely disposed ports 4 and 5 connected respectively with conduits $L_1$ and $L_1$, the port 5 being connected to a chamber 6 extending into the casing and provided with ports 7 and 8 opening into the interior of the casing. The ports of the chamber 6 are controlled by the valve member $G_t$ which is carried by a stem $S_1$ movably guided in the casing. At its upper end the stem is connected with a bellows $B_2$ subject to the pressure in the casing, which bellows is acted on by a spring F. At its opposite end the stem is connected with an open ended cylindrical slide constituting said valve member $G_a$, and movable within a cylindrical shell U fixed in the secondary casing. The said shell is provided with ports O communicating with a port 9 in the secondary casing, which port 9 communicates with the conduit $L_a$.

The relation of the parts described is such that when the valve member $G_t$ is partially opened, the cylindrical slide will cover the ports O, and when the valve member $G_t$ is fully opened, the ports O will begin to be uncovered, so that communication will be established between conduits $L_1$ and $L_a$.

Figure 2:
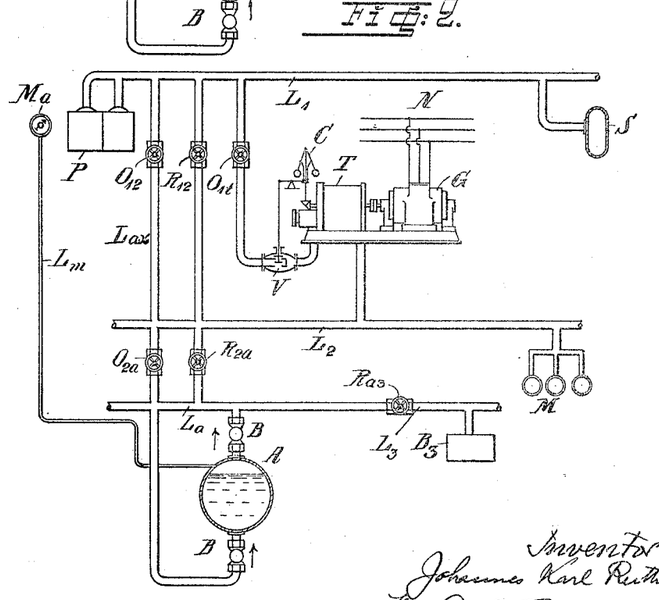
Fig. 2 is a view of a steam plant substantially similar to that shown in Fig. 1, but in which there is a different relative arrangement of parts.

Fig. 2 shows a steam plant similar to that shown in Fig. 1. In addition to the steam consumers S and M of the plant of Fig. 1, a further steam consumer $B_3$, in this case a distilling apparatus, is connected to a conduit $L_3$ which conduit is connected to the conduit $L_a$ by means of a reducing valve $R_{a3}$ similar to reducing valve $R_{a2}$ in Fig. 1 and having the same function; and between the conduit $L_2$ and the conduit $L_a$, an over-flow valve $O_{2a}$ is arranged. Between the conduits $L_1$ and $L_2$ an overflow valve $O_{12}$ is arranged corresponding to over-flow valve $O_{1a}$ of Fig. 1. In this case the pressure in conduit $L_2$ is constant and the accumulator varies in pressure between the value of pressure in conduit $L_2$ and conduit $L_3$. Since pressure in conduit $L_2$ is constant the back pressure on the turbine is constant but is always higher than the pressure in the accumulator. The operation of the parts in this figure is substantially the same in so far as the principle of my invention is concerned, as that of Fig. 1 before described.

Figure 3:
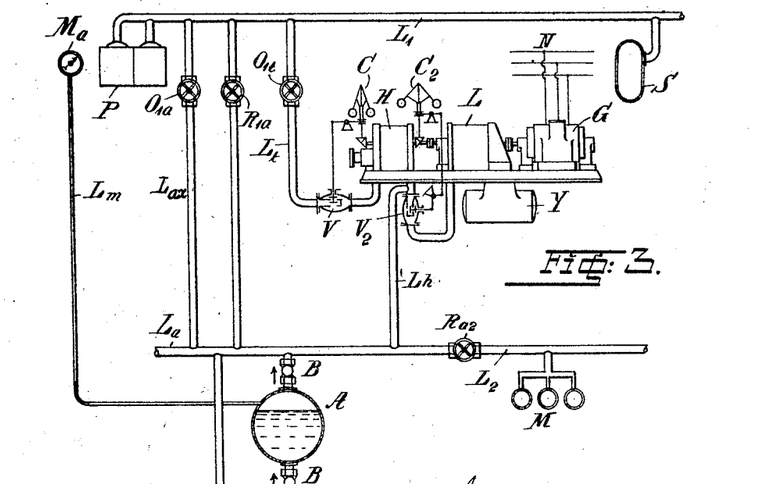
Fig. 3 is a view of a steam plant similar to Fig. 1, with a steam motor of the single extraction type.

Fig. 3 shows a plant in which is arranged a steam motor, in this case a turbine comprising a high pressure unit H and a low pressure unit L, the latter provided with a condenser Y. With such a motor provided with regulating means according to the present invention, the accumulator can also take care of the variations in the consumption of power, as will be presently described.

In order to show clearly the construction of the said motor, the two units of which it is composed are shown separated from each other. The steam supply to the low pressure unit L is controlled by a speed regulating means, a centrifugal governor $C_2$ and a connected valve mechanism $V_2$. This governor $C_2$ controls the steam supply to the low pressure unit at a normal number of revolutions, for example, 3600 R. P. M., and the governor C in front of the high pressure unit controls the steam supply to this unit by the valve V only at an increased number of revolutions, for example, 3800 R. P. M. At the normal number of revolutions, the valve V actuated by the centrifugal governor C will be fully open, the steam supply to the high pressure unit being then controlled by overflow valve mechanism $O_{1t}$.

Supposing now, for example, that the steam consumption in consumer S decreases, or, which is the same, the heat applied to the steam generator is increased, then the pressure in conduit $L_1$ will increase and the valve mechanism $O_{1t}$ will admit the excess of steam to the high pressure unit of the turbine. Consequently, the number of revolutions of the turbine will increase, and the centrifugal governor $C_2$ will act to reduce the quantity of steam admitted to the low pressure unit. In this way a practically constant pressure in the conduit $L_1$, and a normal number of revolutions of the turbine, may be obtained. The quantity of steam led toward the accumulator is thus increased for two reasons, namely, partly on account of more steam being admitted to the high pressure unit, and partly on account of a quantity of steam being cut off from the low pressure unit.

If, as may happen, the number of revolutions should increase to such extent as to cause valve $V_2$ to wholly close, then governor C will come into action and its valve mechanism will throttle the steam supply to the high pressure unit.

Upon a change in the amount of power delivered by the turbine, the centrifugal governor $C_2$ adequately regulates the steam supplied to the low pressure unit. If for instance, the demand for power should increase, the steam supplied to the low pressure unit will be increased, and if the demand for steam is greater than can be supplied from the high pressure unit, a certain quantity of steam will be delivered directly from the accumulator to the low pressure unit through the conduit $L_h$.

Figure 4:
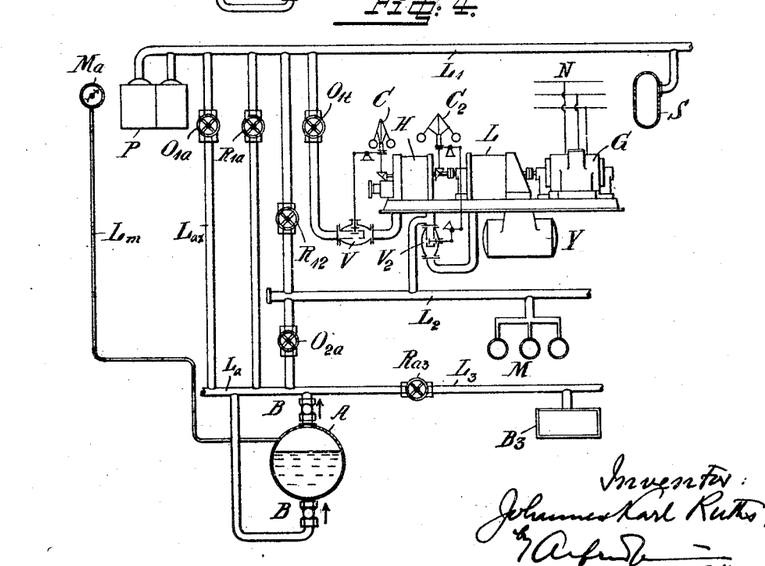
Fig. 4 is a view of a steam plant similar to that shown in Fig. 3, but with a different relative arrangement of parts.

Fig. 4 shows a steam plant substantially similar to Fig. 2, but in Fig. 4 a turbine motor of the type shown in Fig. 3 is employed, and in this Figure 4, between conduit $L_1$ and conduit $L_a$ an over-flow valve $O_{1a}$ is arranged. The operation of the parts in this figure is substantially the same, in so far as the principle of my invention is concerned, as that of Figs. 1 and 2.

In the steam plant shown in Fig. 5 a turbine of the double extraction type is employed, said turbine comprising a high pressure unit H, an intermediate pressure unit $M_2$, and a low pressure unit L. Steam from the high pressure unit is supplied to a conduit $L_2$ and to its connected consumer $S_2$, and steam from the intermediate pressure unit is supplied to a conduit $L_a$ and thence to conduit $L_3$ and its connected consumer M, and steam from the intermediate pressure unit also passes to the conduit $L_a$ and the connected accumulator A. There is therefore in this form of plant two consumers supplied directly with steam under different pressures from the turbine. In the connection between the high pressure unit and intermediate pressure unit of the turbine, is inserted a valve mechanism $O_{2m}$, which may be of the same construction as valve mechanism $O_{1t}$, and this valve $O_{2m}$ controls the supply of steam from the high pressure unit to the intermediate pressure unit in accordance with the pressure in conduit $L_2$, in the same manner that valve $O_{1t}$ controls the supply to the high pressure unit in accordance with the pressure in conduit $L_1$ as hereinbefore described.

The control of the steam supply under the action of the speed of the turbine as effected by the centrifugal governors, is the same as that described in connection with Fig. 3, except that in Fig. 5 an additional governor $C_3$ is provided to control the steam supplied to the intermediate pressure unit, which governor is operatively connected with a valve mechanism $V_3$ inserted in the connection between the high pressure unit and the intermediate pressure unit, behind the before mentioned valve mechanism $O_{2m}$.

In the operation of the speed governor mechanism here shown, it will be understood that the governor $C_2$ will regulate the steam supplied to the low pressure unit when the revolutions of the turbine are at the normal number, for example, 3600 R. P. M. Under this condition, governors C and $C_3$ will hold their respective valves in full open position, the steam flowing to the high pressure and intermediate pressure units being controlled by the overflow valve mechanisms $O_{1t}$ and $O_{2m}$ respectively. Should the number of revolutions increase above normal, for example, to 3800 R. P. M., the governor $C_3$ will decrease the steam supplied to the intermediate pressure unit, and with further increase of the speed, for example, to 4000 R. P. M. the governor C will come into action and will control the steam supplied to the high pressure unit.

Figure 8:
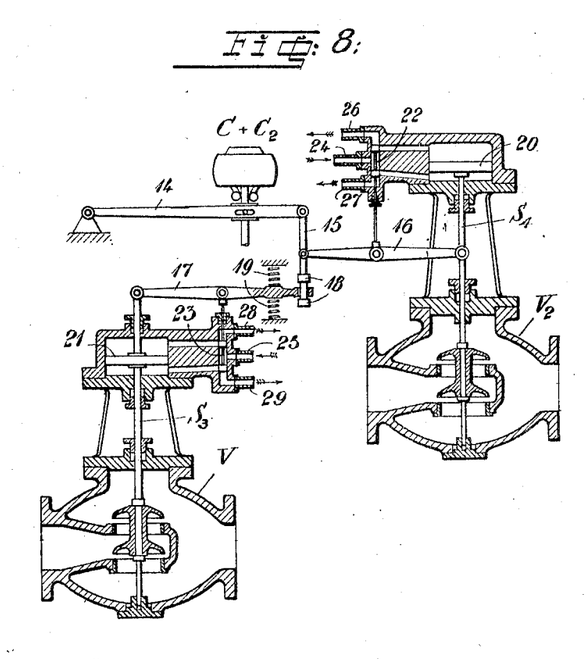
Fig. 8 is a sectional view of two inter-connected valve mechanisms controlled by a single speed governor.

While in Figs. 3, 4 and 5 a plurality of speed governors is shown for each turbine, with each governor connected to operate its associated valve mechanism, it will be understood that a single speed governor may be employed and connected to actuate a plurality of valve mechanisms so that the valves will be operated in succession as the speed increases. Such a mechanism is shown in Fig. 8 where it will be seen that two valve mechanisms V and $V_2$ have their valve stems $S_3$ and $S_4$ connected respectively with piston plungers 21 and 20 sliding in power cylinders, to which cylinders pressure fluid is admitted by pipes 25 and 24, and from which the pressure fluid exhausts by pipes 28 and 29, and pipes 26 and 27, the control of the pressure fluid to and from the cylinders being effected by slide valves 23 and 22 connected to levers 17 and 16 which are in turn connected to the valve stems $S_3$ and $S_4$. The lever 17 is acted on by springs 19 which hold it yieldingly in a neutral position, and the end of the lever is formed with an opening through which loosely slides a rod 15 provided with spaced collars 18 disposed on opposite sides of the lever 17, this arrangement permitting of a limited movement or play of the rod relative to the lever without affecting the latter. The rod is connected to the lever 16, and to a lever 14 fulcrummed at one end, and a centrifugal governor $C+C_2$ is operatively connected with the lever 14 to rock the same more or less according to the speed of revolution.

The relation and form of the above described parts are such that under the normal number of revolutions of the governor, both valves will be held in open position as shown. Should the number of revolutions increase, valve $V_2$ will start to close, in which action rod 15 will move, due to its play relative to lever 17, without moving the latter, and consequently valve V will remain open. If now the number of revolutions further increases, valve $V_2$ will be completely closed, and in this action collar 18 will act upon lever 17, and by means of slide 23 controlling piston 21, valve V will be throttled. The two valves V and $V_2$ correspond in this example to the valves V and $V_2$ of Fig. 3.

In Figs. 2, 3, 4 and 5, reducing valves $R_{1a}$ in Figs. 3 and 4, and $R_{12}$ in Figs. 2, 4 and 5 and $R_{2a}$ in Figs. 2 and 5 are shown. These valves act similarly to the reduction valve $R_{1a}$ of Fig. 1 to admit steam to the conduit leading from the valve, in the event that the pressure in the said conduit falls below a predetermined value.

In the various forms of plants hereinbefore described, a pressure gage $M_a$ is shown connected with the steam accumulator by means of a pipe $L_m$, the function of which gage is described and claimed in my copending application Serial No. 305,622, and as this gage is not directly concerned with the present improvements, it will not be necessary to describe the same more fully herein.

As already mentioned, the accumulator together with the arrangements of the controlling means or valves in the plants described not only bring about an equalization of different steam consumptions within the plant, but also equalize any variations in the supply of fuel to the boilers. Such variations may be caused by fluctuations in quantity of heat available, especially with sources of heat of varying magnitude, such as blast furnace gases, waste heat from industrial furnaces, electric currents and so forth. But also when firing with coal, wood or the like unavoidable variations arise, caused by irregular composition of the fuel by clinkering or by careless supervision of the plant. Variations of most violent character are met with in purely automatic firing apparatus. Such variations also are equalized without any difficulties by means of the accumulator with the aid of the arrangements hereinbefore described.

Having thus described my invention, what I claim is:

1. In a steam plant, the combination with a source of variable steam supply, a motor supplied with steam from said source, an accumulator receiving steam from said motor, and a consumer supplied by said accumulator, of pressure responsive means controlling flow of steam from said source to said motor so that steam pressure in said source is maintained constant.

2. A steam plant comprising in combination, a steam generator, a steam conduit connected to receive steam therefrom, a steam motor connected with the conduit, a steam accumulator supplied with steam from the said motor, a steam consumer supplied with steam from the accumulator, a valve member adapted to regulate the steam supply to the motor, and means for operating the said valve member to increase the steam supply to the said motor upon an increase of pressure in the conduit from which the motor is supplied above a predetermined value, while decreasing the steam supply upon a decrease of said steam pressure below a predetermined value.

3. A steam plant comprising in combination, a steam generator, a steam conduit connected to receive steam therefrom, a steam motor connected with the conduit, a steam accumulator supplied with steam from the said motor, a steam consumer supplied with steam from the accumulator, a valve member arranged in front of the said motor and adapted to control the steam supplied thereto, and means for operating the said valve member responsive to pressure in front of the said valve member.

4. A steam plant comprising in combination, a steam generator, a steam conduit system connected thereto, a steam motor comprising a high pressure unit connected to a conduit in the said conduit system and a low pressure unit receiving steam from the high pressure unit, a steam accumulator supplied with steam from the motor, a consumer supplied by said accumulator, a valve member arranged in the conduit system and adapted to control the steam supplied to the motor, and means for actuating said valve member and operating to increase the steam supply to the high pressure unit upon an increase of the pressure in the conduit above a predetermined value.

5. A steam plant comprising in combination, a steam generator, a steam conduit connected thereto, a steam motor comprising a plurality of pressure units including a high pressure unit connected to said conduit, a steam accumulator supplied with steam from one of the pressure units, a steam consumer supplied with steam from the accumulator, a valve member arranged in front of the high pressure unit and adapted to control the steam supplied thereto, and means for actuating said valve member and operating to increase the steam supply to the said high pressure unit upon an increase of the pressure in front of the said valve member above a predetermined value, while decreasing the steam supply upon a decrease of said pressure below a predetermined value.

6. A steam plant comprising in combination, a steam generator, a steam conduit connected to receive steam therefrom, a steam motor comprising a high pressure unit connected with said conduit and a low pressure unit receiving steam from the high pressure unit, a steam consumer supplied with steam from the high pressure unit, a steam accumulator supplied with steam from the motor ahead of the low pressure unit and adapted to supply steam to a steam consumer, a valve member arranged in front of the high pressure unit and adapted to regulate the steam supplied thereto, and means for operating said valve member to increase the steam supply to the said high pressure unit upon an increase of the pressure in front of the said valve member above a predetermined value, while decreasing the steam supply upon a decrease of said pressure below a predetermined value.

7. A steam plant comprising in combination, a steam generator, a steam conduit connected to receive steam therefrom, a steam motor comprising a high pressure unit connected to said conduit and a unit of lower pressure connected to the high pressure unit to receive steam therefrom, a steam accumulator supplied with steam from the unit of lower pressure, a valve member arranged in front of the high pressure unit and adapted to regulate the steam supplied thereto, means for operating said valve member responsive to the pressure in front of said valve member, a valve mechanism in the connection between the high pressure unit and the unit of lower pressure and responsive to the pressure in front of it to control the supply of steam to the unit of lower pressure and means to receive and use steam from the accumulator and the high pressure unit.

8. A steam plant comprising in combination, a steam generator, a steam conduit system connected thereto, a steam motor connected to a conduit in said conduit system to receive steam from the generator, a steam accumulator connected to the motor to receive steam therefrom, a consumer supplied by said accumulator, means connected in the conduit system and operated by the pressure in said conduit and operating to increase the steam supply to the motor upon an increase of said pressure above a predetermined value, and means controlled by the speed of rotation of the motor and acting to decrease the steam supply to the motor when the speed increases above a predetermined value.

9. In a steam plant, the combination with a source of variable steam supply, a motor supplied with steam from said source, an accumulator receiving steam from said motor, means to receive and use steam from the accumulator and an overflow valve mechanism controlling flow of steam from said source to said motor so that steam pressure in said source is maintained constant.

10. A steam plant comprising in combination, a steam generator, a steam conduit connected to receive steam therefrom, a steam motor comprising a high pressure unit connected to said conduit and a low pressure unit receiving steam from the high pressure unit, a steam accumulator supplied with steam from the motor ahead of said low pressure unit, a consumer supplied by said accumulator, a valve member arranged in front of the high pressure unit and adapted to regulate the steam supplied thereto, means for operating said valve member to increase the steam supply to the said high pressure unit upon an increase of the pressure in front of said valve member above a predetermined value, while decreasing the steam supply upon a decrease of said pressure below a predetermined value, means actuated at the normal speed of the motor to control the supply of steam to the low pressure unit, and means actuated at a higher speed of the motor to control the supply of steam to the high pressure unit.

11. A steam plant comprising in combination, a steam generator, a steam conduit receiving steam therefrom, a steam motor comprising a high pressure unit connected to said conduit and a low pressure unit receiving steam from the high pressure unit, a steam accumulator supplied with steam from the high pressure unit, a consumer supplied by said accumulator, a valve member arranged in front of the high pressure unit and operated in response to pressure in said conduit, means actuated at the normal speed of the motor to control the supply of steam to the low pressure unit, and operable to shut off the supply to said unit, and means adapted to be brought into action when the steam supply to the low pressure unit is shut off, and operable to control the steam supply to the high pressure unit.

12. A steam plant comprising in combination, a steam generator, a steam conduit system connected thereto, a steam motor connected to a conduit in said conduit system to receive steam from the generator, a steam accumulator connected to the motor to receive steam therefrom, a steam consumer supplied with steam from the accumulator, means connected in the conduit system and operated by the pressure in said conduit to increase the steam supply to the motor upon an increase of said pressure above a predetermined value, and a consumer adapted to receive steam from the said motor.

13. A steam plant comprising in combination, a steam generator, a steam conduit connected to receive steam therefrom, a steam motor connected with the conduit, a steam accumulator supplied with steam from the said motor, a consumer supplied by said accumulator, a valve member arranged in front of the said motor and adapted to regulate the steam supply thereto, means for operating the said valve member to increase the steam supply to the said motor upon an increase of the pressure in front of the said valve member above a predetermined value, while decreasing the steam supply upon a decrease of the steam pressure below a predetermined value, a conduit to supply steam from the generator to the accumulator independently of the supply by the motor, a second valve member inserted in the latter conduit, and means adapted to open said second valve member upon an increase of pressure in front of the same when the other valve member is fully open.

14. A steam plant comprising in combination, a steam generator, a steam conduit connected to receive steam therefrom, a consumer connected to the said conduit and adapted to receive steam therefrom, a steam motor connected to the said conduit to receive steam from the generator, a steam accumulator connected to the motor to receive steam therefrom, a second steam consumer supplied with steam from the accumulator, and means operated by the pressure in said conduit to increase the steam supply to the motor upon an increase of said pressure above a predetermined value.

15. A steam plant comprising in combination, a steam generator, a steam conduit connected to receive steam therefrom, a steam consumer connected to said conduit, a steam motor receiving steam from said conduit, a steam accumulator supplied with steam from said motor and adapted to deliver steam to a second steam consumer, a valve member adapted to control the steam supply to the motor, and means for operating the said valve member to increase the steam supply to the said motor upon an increase of pressure in the conduit from which the motor is supplied above a predetermined value, while decreasing the steam supply upon a decrease of said steam pressure below a predetermined value.

16. A steam plant comprising in combination, a steam generator, a steam conduit connected to receive steam therefrom, a steam consumer adapted to receive steam from said conduit, a steam motor connected with the conduit, a steam accumulator supplied with steam from the said motor and adapted to deliver steam to a second steam consumer, a valve member arranged in front of the said motor and adapted to regulate the steam supplied thereto, and means for operating said valve member to increase the steam supplied to the said motor upon an increase of the pressure in front of the said valve member above a predetermined value, while decreasing the steam supply upon a decrease of the steam pressure below a predetermined value.

17. A steam plant comprising in combination, a steam generator, a steam conduit system connected thereto, a conduit in said conduit system, a consumer connected to said conduit to receive steam therefrom, a steam motor comprising a high pressure unit connected to the said conduit and a low pressure unit receiving steam from the high pressure unit, a steam accumulator supplied with steam from the high pressure unit, and adapted to deliver steam to the low pressure unit, a valve member arranged in the conduit system and adapted to regulate the steam supplied to the motor, and means for operating said valve member to increase the steam supply to the high pressure unit upon an increase of the pressure in the said conduit above a predetermined value.

18. A steam plant comprising in combination, a steam generator, a steam conduit connected to receive steam therefrom, a steam consumer connected to said conduit and adapted to receive steam therefrom, a steam motor connected to said conduit, said motor comprising a plurality of units including a low pressure unit, a steam accumulator supplied with steam from a unit of the motor ahead of the low pressure unit and adapted to deliver steam to the low pressure unit, a valve member arranged in front of the motor and adapted to regulate the steam supplied thereto, and means for operating said valve member to increase the steam supply to the motor upon an increase in the pressure in front of said valve member above a predetermined value while decreasing the steam supply upon a decrease of said pressure below a predetermined value.

19. A steam plant comprising in combination, a steam generator, a steam conduit connected to receive steam therefrom, a consumer connected to said conduit and adapted to receive steam therefrom, a steam motor comprising a plurality of pressure units including a high pressure unit, said motor receiving steam from said conduit, a steam accumulator supplied with steam from one of the pressure units, a second steam consumer supplied with steam from the accumulator, a valve member arranged in front of the high pressure unit and adapted to regulate the steam supplied thereto and means to operate said valve member, said means operating to increase the steam supply to the said high pressure unit upon an increase of the pressure in front of the said valve member above a predetermined value, while decreasing the said steam supply upon a decrease of said pressure below a predetermined value.

20. A steam plant comprising in combination, a steam generator, a steam conduit connected to receive steam therefrom, a consumer connected to said conduit to receive steam therefrom, a steam motor comprising a high pressure unit connected with said conduit and a low pressure unit receiving steam from the high pressure unit, a second steam consumer supplied with steam from the high pressure unit, a steam accumulator supplied with steam from the motor ahead of the said low pressure unit and adapted to deliver steam to the low pressure unit, a valve member arranged in front of the high pressure unit and adapted to regulate the steam supplied thereto and means for operating said valve member to increase the steam supply to the said high pressure unit upon an increase of the pressure in front of the said valve member above a predetermined value, while decreasing the steam supply upon a decrease of said pressure below a predetermined value.

21. A steam plant comprising in combination, a steam generator, a steam conduit connected to receive steam therefrom, a consumer connected to said conduit, a steam motor comprising a high pressure unit connected with said conduit and a unit of lower pressure receiving steam from the high pressure unit, a second steam consumer supplied with steam from the high pressure unit, a third steam consumer supplied with steam from the unit of lower pressure, a steam accumulator supplied with steam from the motor and supplying steam to a consumer, a valve member arranged in front of the high pressure unit and adapted to control the steam supplied thereto, and actuating means for said valve member to increase the steam supply to the said high pressure unit upon an increase of the pressure in front of the said valve member above a predetermined value, while decreasing the steam supply upon a decrease of said pressure below a predetermined value.

22. A steam plant comprising in combination, a steam generator, a steam conduit connected to receive steam therefrom, a consumer adapted to receive steam from said conduit, a steam motor comprising a high pressure unit connected to said conduit and a unit of lower pressure connected to the high pressure unit to receive steam therefrom, a steam accumulator supplied with steam from the unit of lower pressure, a consumer supplied with steam from the accumulator, a valve member arranged in front of the high pressure unit and adapted to control the steam supplied thereto, means for actuating said valve member and operating to increase the steam supply to the said high pressure unit upon an increase in the pressure in front of said valve member above a predetermined value while decreasing the steam supply upon a decrease of said pressure below a predetermined value, and a valve mechanism interposed between the high pressure unit and the unit of lower pressure and actuated by the pressure in front of it to control the supply of steam to the unit of lower pressure.

23. A steam plant comprising in combination, a steam generator, a steam conduit connected to receive steam therefrom, a steam consumer connected to said conduit, a steam motor connected to said conduit, a steam accumulator connected to the motor to receive steam therefrom and adapted to supply steam to a second consumer, means operated by the pressure in said conduit to increase the steam supply to the motor upon an increase of said pressure above a predetermined value, and means controlled by the speed of rotation of the motor and acting to decrease the steam supplied to the motor when the speed increases above a predetermined value.

24. A steam plant comprising in combination, a steam generator, a steam conduit system connected to receive steam therefrom, a steam conduit in said conduit system, a steam motor comprising a high pressure unit connected to the conduit system and a low pressure unit receiving steam from the high pressure unit, a steam consumer connected to said conduit, a steam accumulator supplied with steam from the motor ahead of the low pressure unit and adapted to deliver steam to a second consumer, a valve member arranged in the conduit system and adapted to regulate the steam supply to the motor, means to actuate said valve member to increase the steam supply to the motor upon an increase of pressure above a predetermined value in the conduit from which the motor is supplied, means actuated at the normal speed of the motor to control the supply of steam to said low pressure unit, and means actuated at a higher speed of the motor to control the supply of steam to the other pressure unit.

25. A steam plant comprising in combination, a steam generator, a steam conduit connected to receive steam therefrom, a steam consumer adapted to receive steam from said conduit, a steam motor comprising a high pressure unit connected to receive steam from said generator and a low pressure unit receiving steam from the high pressure unit, a steam accumulator supplied with steam from the high pressure unit and adapted to supply steam to a second consumer, a valve member arranged in front of the high pressure unit and adapted to regulate the steam supplied thereto, means responsive to the pressure ahead of said valve member to actuate the same, to increase the steam supply to the said high pressure unit upon an increase of the pressure in front of said valve member above a predetermined value, while decreasing the steam supply upon a decrease of said pressure below a predetermined value, means actuated at the normal speed of the motor to control the supply of steam to the low pressure unit, and means actuated at a higher speed of the motor to control the supply of steam to the high pressure unit.

26. A steam plant comprising, in combination, a steam generator, a consumer connected to receive steam from said steam generator, a motor connected to receive steam from said steam generator in parallel to said consumer, a low pressure conduit, a connection between said motor and said low pressure conduit, a consumer connected to said low pressure conduit, an accumulator connected to said low pressure conduit, means to conduct steam parallel to said motor to said accumulator, pressure responsive means controlling supply of steam to said motor and operating to increase the supply thereto upon increase of pressure, and pressure responsive means to control the means conducting steam parallel to the motor.

27. A steam plant comprising in combination, a steam generator, a steam conduit connected to receive steam therefrom, a steam consumer adapted to receive steam from said conduit, a steam motor comprising a high pressure unit connected to said conduit and a low pressure unit receiving steam from the high pressure unit, a steam accumulator supplied with steam from the motor at a point in front of the low pressure unit and adapted to deliver steam to the low pressure unit, a valve member arranged in front of the high pressure unit and adapted to regulate the steam supplied thereto, means to operate said valve member to increase the steam supplied to the said high pressure unit upon an increase of the pressure in front of the valve member above a predetermined value, while decreasing the steam supply upon a decrease of said pressure below a predetermined value, a valve mechanism in front of each of said units and adapted to control the supply of steam to the respective units, and speed regulating means adapted to actuate the said valve mechanisms.

28. A steam plant comprising, in combination, a steam generator, a steam conduit system connected therewith, a steam motor connected in said conduit system to receive steam from the generator, a steam accumulator connected to the motor to receive steam therefrom, a steam consumer supplied with steam from the accumulator and means connected in the conduit system and regulated by the pressure therein and operating to increase the steam supply to the motor upon an increase of pressure.

29. A steam plant comprising in combination, a steam generator, a steam conduit system connected thereto, a steam consumer adapted to receive steam from said steam generator, a steam motor connected in said conduit system to receive steam from the generator, a steam accumulator connected to the motor to receive steam therefrom, a steam consumer, supplied with steam from the accumulator, means connected in the conduit system and operated by the pressure in the conduit supplying steam to the motor to increase the steam flow to the motor upon an increase of said pressure above a predetermined value, and a consumer adapted to receive steam from the said motor.

30. A steam plant comprising in combination, a steam generator, a steam conduit connected to receive steam therefrom, a steam consumer connected to said steam conduit and adapted to receive steam therefrom, a steam motor connected to said conduit, a steam accumulator supplied with steam from the said motor and delivering steam to a consumer, a valve member arranged in front of the said motor and adapted to control the steam flow thereto, means for operating the said valve member to increase the steam flow to the said motor upon an increase of the pressure in front of the said valve member above a predetermined value, while decreasing the steam flow upon a decrease of the steam pressure below a predetermined value, a conduit to supply steam from the generator to the accumulator independently of the supply to the motor, a second valve member inserted in the latter conduit, and means adapted to open said second valve member upon an increase in pressure in front of the same when the first mentioned valve member is fully opened.

31. A steam plant comprising in combination, a steam generator having a variable heat supply, a steam conduit connected thereto, a steam motor connected with the conduit, a steam accumulator supplied with steam from the said motor, a steam consumer supplied with steam from the said accumulator, means to prevent fluctuation in pressure in said generator due to variable steam generation comprising a valve member adapted to control the steam supply to the motor and means responsive to the generator pressure for actuating said valve member to increase the steam flow through the said valve member upon an increase of the generator pressure above a predetermined value, while decreasing the steam flow upon a decrease of the said pressure below a predetermined value.

32. A steam plant comprising, in combination, a steam generator, a consumer supplied with steam from said generator, a motor supplied with steam in parallel to said consumer, an accumulator supplied with steam in parallel with said consumer, a consumer supplied from the accumulator and pressure responsive means to regulate the supply of steam to said motor and said accumulator so that the pressure of steam supplied to the first-mentioned consumer is maintained substantially constant.

33. A steam plant comprising, in combination, a steam generator, a consumer supplied with steam therefrom, a motor supplied with steam from said generator in parallel to said consumer, an accumulator receiving steam from the motor, a consumer supplied from the accumulator and pressure responsive means to regulate the supply of steam to the motor so that the pressure of steam supplied to the first-mentioned consumer is maintained substantially constant.

34. A steam plant comprising, in combination, a steam generator, a steam motor connected to receive steam from said steam generator, a low pressure conduit, a connection between said motor and said low pressure conduit, a consumer connected to said low pressure conduit, an accumulator connected to said low pressure conduit, means to conduct steam parallel to said motor to said accumulator, pressure responsive means controlling supply of steam to said motor and operating to increase the supply thereto upon an increase of pressure, and pressure responsive means to control the means conducting steam parallel to said motor.

35. In a steam plant, the combination with a source of variable steam supply, a motor, a conduit conducting steam from said source to said motor, pressure responsive means to control flow through said conduit including a throttling valve in said conduit, said throttling valve comprising a casing having a plurality of ports within the same, and a balanced valve member controlling said ports, so that steam pressure in said source is maintained constant, an accumulator receiving steam from said motor and a consumer supplied by the accumulator.

In testimony whereof I affix my signature.

JOHANNES KARL RUTHS.